Oct. 11, 1932.　　C. F. COWDREY　　1,882,356
BRAKE TESTING DEVICE
Filed Feb. 8, 1926　　6 Sheets-Sheet 1

INVENTOR
Charles F. Cowdrey
BY Robt O Harris
ATTORNEY

Oct. 11, 1932.  C. F. COWDREY  1,882,356
BRAKE TESTING DEVICE
Filed Feb. 8, 1926    6 Sheets-Sheet 2

INVENTOR:
Charles F. Cowdrey
BY Rob't O. Hains
ATTORNEY

Oct. 11, 1932.          C. F. COWDREY                 1,882,356
                      BRAKE TESTING DEVICE
                      Filed Feb. 8, 1926          6 Sheets-Sheet 3

Oct. 11, 1932.    C. F. COWDREY    1,882,356
BRAKE TESTING DEVICE
Filed Feb. 8, 1926    6 Sheets-Sheet 4

INVENTOR
Charles F. Cowdrey
BY Robt P. Hains
ATTORNEY

Patented Oct. 11, 1932

1,882,356

UNITED STATES PATENT OFFICE

CHARLES F. COWDREY, OF FITCHBURG, MASSACHUSETTS, ASSIGNOR, BY MESNE ASSIGNMENTS, TO BENDIX-COWDREY BRAKE TESTER, INC., OF FITCHBURG, MASSACHUSETTS, A CORPORATION OF DELAWARE

BRAKE TESTING DEVICE

Application filed February 8, 1926. Serial No. 86,742.

This invention relates to devices for testing the action of the brakes upon the different wheels of an automobile.

It is extremely important that the brakes of an automobile be kept in good condition and properly adjusted so that they act with equal or substantially equal force upon the opposite wheels of the automobile.

It is a relatively simple matter to tighten the brakes of an automobile so that the automobile may be brought to rest promptly, but unless care is taken in adjusting the brakes so that they act with substantially equal braking force upon the opposite automobile wheels the automobile itself is likely to swerve from its direct path of travel with dangerous results, and many of the automobile accidents which are now frequently occurring are due to improperly adjusted brakes.

In view of the importance of keeping the brakes of an automobile properly adjusted, the present invention relates to means for rotating a wheel of an automobile under brake resistance and for indicating or measuring the turning force applied to the wheel so that the action of the brakes upon the different wheels of an automobile may be accurately determined to facilitate the proper adjustment of the brakes.

One important feature of the present invention resides in spaced rollers positioned to support the wheels of an automobile so that a wheel may be turned under brake resistance by rotating the roller upon which it rests, and in means for rotating the rollers and for indicating the force applied to turn a wheel under brake resistance.

Another important feature of the invention resides in rollers for supporting each of the wheels of an automobile and in means for supporting the rollers for the front and rear wheels so that the rollers for one pair of wheels may be moved toward and from the rollers for the other pair of wheels to thereby accommodate automobiles of different length wheel base.

Another important feature resides in the arrangement of the rollers with respect to a runway for the automobile wheels so that the automobile may be driven under its own power into and out of the position in which its wheels rest upon the brake testing rollers.

Still another feature of the invention resides in an automobile platform upon which the wheel supporting rollers are mounted, and in the arrangement by which an automobile may be driven upon the platform into position to engage its wheels with the different rollers, so that the action of the brake upon any wheel may be tested by rotating the roller that engages that wheel and indicating the turning force applied to the roller to turn the wheel.

Other features of the invention and novel combination of parts in addition to the above will be hereinafter described in connection with the accompanying drawings, which illustrate good, practical forms of the invention.

Figures 12, 13:
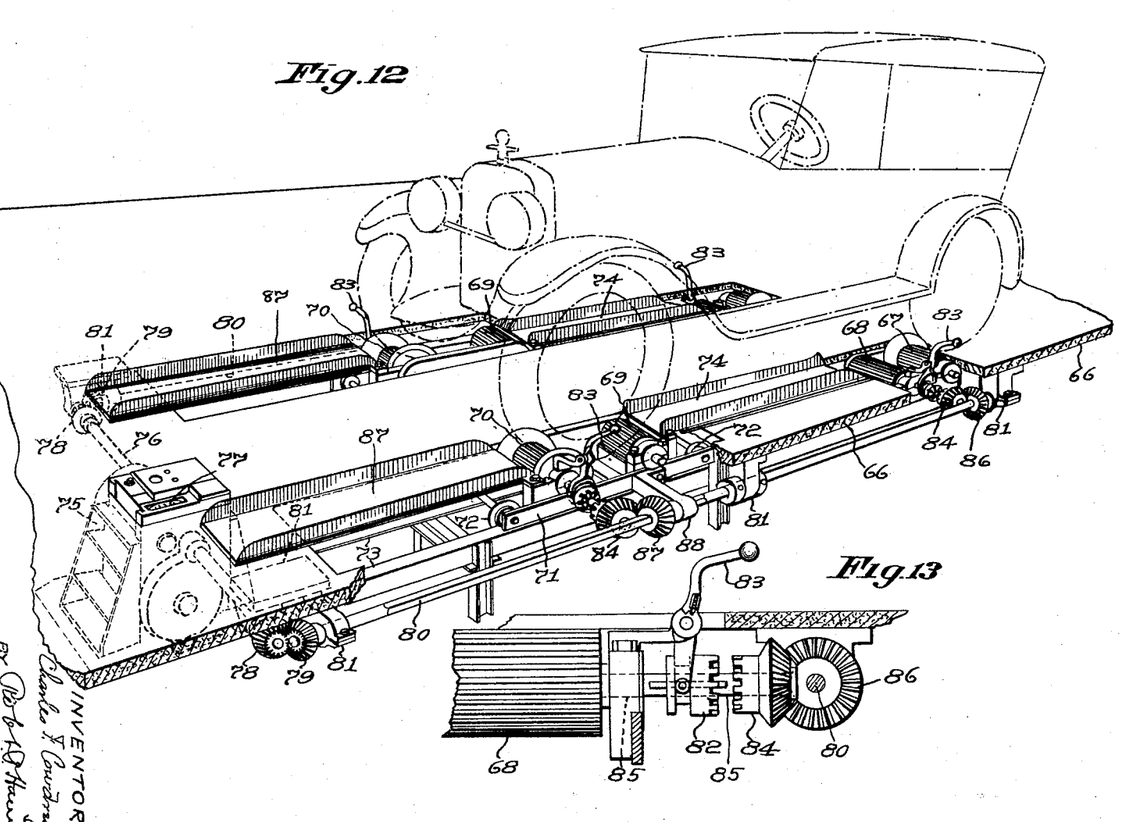
Fig. 12 is a perspective view showing a modification of a testing device constructed in accordance with the present invention.
Fig. 13 on an enlarged scale is a sectional view of the clutch mechanism of Fig. 12.

The brake testing device forming the subject matter of the present invention may be provided with wheel supporting rollers that are mounted on a platform as shown in Figs. 1 to 11 inclusive, or the rollers may be mounted substantially flush with the ground or floor, as shown in the modified construction of Fig. 12.

Figures 1, 2:
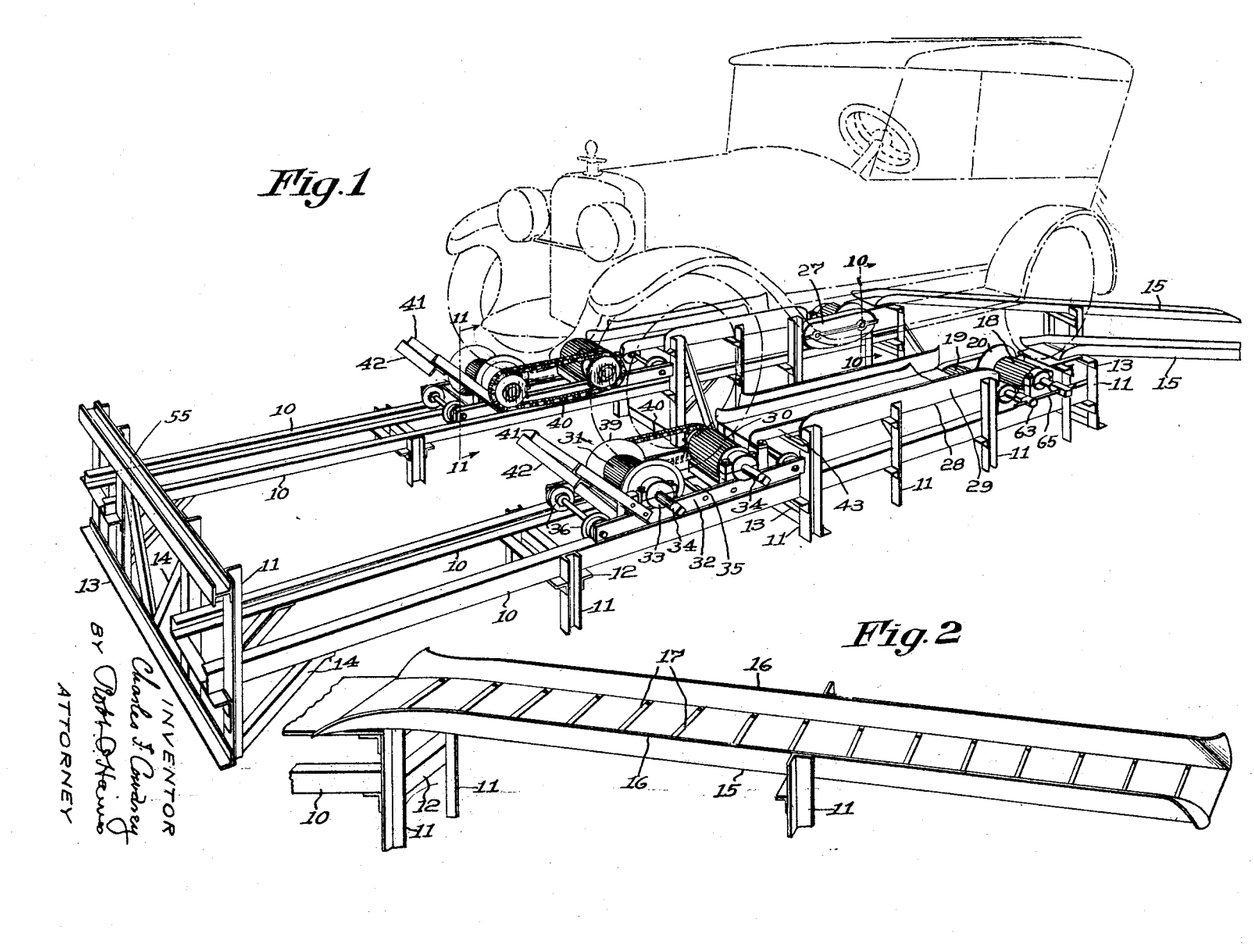
Fig. 1 is a perspective view of a platform or supporting frame provided with the brake testing means of the present invention, and an automobile is indicated in dotted lines as resting upon the platform adjacent the brake testing position.
Fig. 2 is a perspective view of one of the inclined runways leading up to the platform.

Referring first to the construction shown in Figs. 1 to 11 inclusive, spaced rollers are provided to support each of the four wheels of an automobile, and these rollers are mounted on a platform or supporting frame which supports the rollers in spaced relation to the ground, as best shown in Fig. 1. The automobile supporting frame or platform of Fig. 1 may be variously constructed, and as shown consists of longitudinally extending angle irons 10, two being supported in spaced relation to each other at one side of the platform, and two being similarly supported at the opposite side of the platform. These angle irons 10 are supported at the desired distance from the floor or ground by the uprights 11, and these uprights are preferably arranged in pairs at each side of the platform, and are connected by the transversely extending bars or angle irons 12 to form strong, rigid supports for the longitudinally extending angle irons. The pairs of uprights 11 disposed at the opposite sides of the frame are preferably connected by the transversely extending braces 13 disposed at each end of the platform and at one or more points intermediate the ends of the platform, as shown, and the strength of the supporting structure may be increased by providing any desired number of inclined braces 14. The arrangement is preferably such that the entire platform constitutes a portable structure which rests upon the floor of a garage or other building and which may be moved from place to place by sliding the same over the floor.

Figure 3:
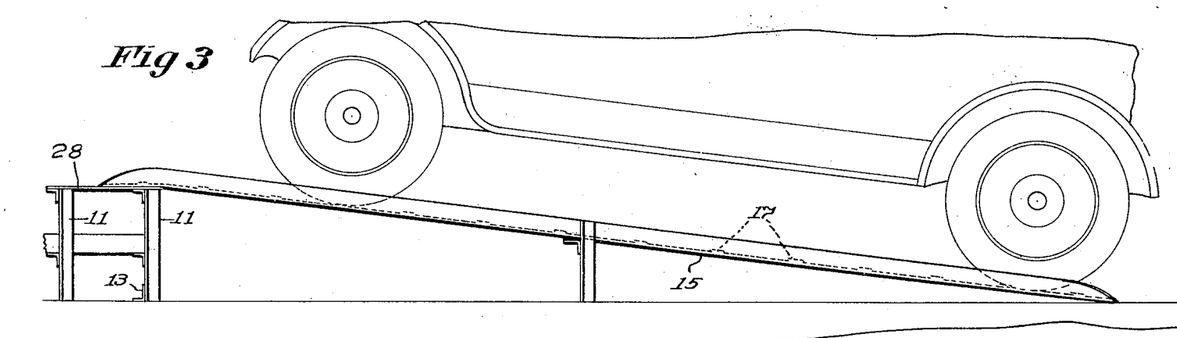
Fig. 3 is a side elevation showing an automobile upon the inclined runways leading to the brake testing platform.

At one end of the automobile supporting platform are provided a pair of inclined runways 15, each having one end resting upon the ground or floor and the other end resting upon the right-hand end portion of the platform, as clearly shown in Figs. 1, 2 and 3. These inclined runways are placed in spaced relation to each other to receive the opposite wheels of an automobile so that the automobile may be driven up these inclined runways on to the platform under its own power. The runways 15 are preferably provided with the upstanding sides 16 which will serve to guide the wheels of the automobile to their proper position upon the platform, and cleats or the like 17 may be provided upon the inclined runways to prevent the wheels of the automobile from slipping. The construction of the platform obviously may be varied as desired, but, as above stated, it is preferably formed as an integral structure which may be readily moved from place to place, as may be found expedient.

The brake testing device of the present invention is preferably constructed so that it may be employed to test the brakes of an automobile having either two-or-four-wheel brakes, and it is also preferably constructed so that it may be employed to test automobiles having different length wheel base. The rollers to be described which support one pair of wheels are therefore mounted for movement lengthwise of the platform relative to the rollers which support the other pair of wheels, as will more fully appear from the following description.

In the embodiment of the invention shown, a pair of rollers is provided for supporting each wheel of an automobile, but if desired each wheel to be tested may be supported by other forms of tread-engaging means. The pairs of rollers which support the front wheels of the automobile in the present case are mounted for movement longitudinally of the platform relatively to the rollers which support the rear wheels, but this is not essential in all embodiments of the invention, for it will be apparent that either the front or rear rollers may be mounted for movement lengthwise of the supporting platform to accommodate automobiles of different lengths.

Figure 10:
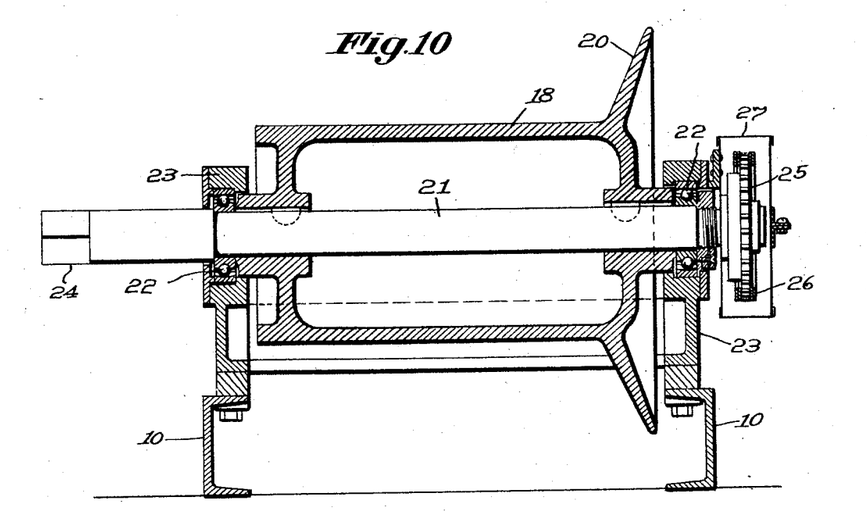
Fig. 10 on an enlarged scale is a sectional view taken on the line 10—10 of Fig. 1.
Figure 11:
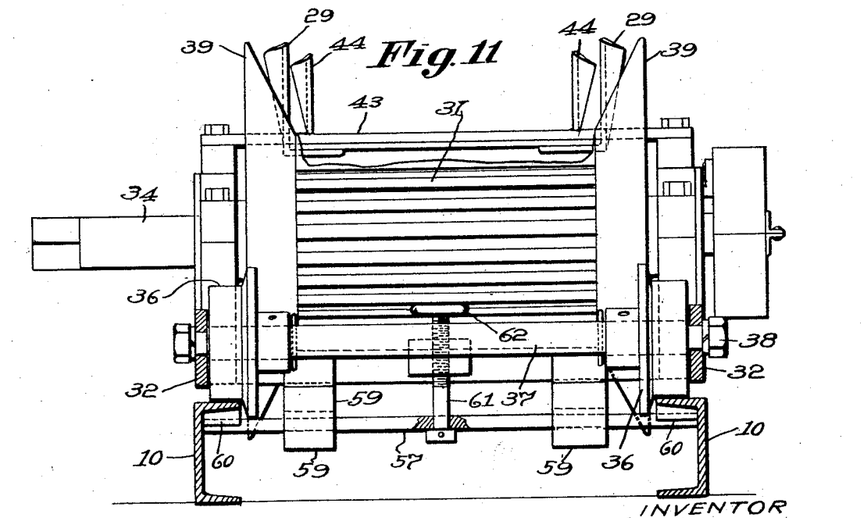
Fig. 11 on an enlarged scale is a sectional view taken on the line 11—11 of Fig. 1.

The rollers for supporting the rear wheels of an automobile are designated by the numerals 18 and 19 and one of these rollers upon each side of the platform, for example the roller 18, is provided with a flange 20 at one end thereof to limit the movement of a wheel engaging the same lengthwise of the roller, and it will be apparent that the provision of a single flange at each side of the platform will suffice to prevent the automobile from moving laterally sufficiently to disengage its rear wheels from the supporting rollers 18 and 19. The roller 18, as best shown in Fig. 10, is keyed or otherwise rigidly secured to a supporting shaft 21, and this shaft is provided near its opposite ends with the anti-friction bearings 22 which are mounted in bearing brackets 23 secured to the longitudinally extending channel irons 10, and in order that power may be applied to the roller 18 to drive the same to thereby rotate the automobile wheel resting upon this roller, the outer end of the shaft 21 is shown as squared as at 24 to receive any suitable form of driving means. The second roller 19 of each pair of rollers for the rear wheels may be similar in construction to the rollers 18 except that it is unnecessary to provide the rollers 19 with the flange 20. It is desirable to provide means for imparting the rotative movement from one of the pair of rollers 18, 19 to the other, and this is accomplished in the construction shown by providing the inner end of each supporting shaft 21 with a sprocket 25 adapted to receive a sprocket chain 26 for imparting the rotative movement of one roller to the other, and the sprocket chains 26 are preferably enclosed in a protecting casing 27. The rollers 18 and 19 are preferably mounted upon the platform so that the upper face of each roller lies substantially flush with the floor plates or runways 28 of the platform; so that as an automobile is driven lengthwise of the platform the wheels will pass smoothly from the floor plates 28 to the supporting rollers 18 and 19, and the floor plates 28 are preferably provided with the upstanding side flanges 29 adapted to guide the automobile wheels lengthwise of the platform.

If it is desired to test the action of the brakes upon only the rear wheels of an automobile then it will be necessary to provide the platform with only the rollers 18 and 19 at the opposite sides of the platform, but if it is desired to test the brakes upon all four wheels of an automobile, then supporting rollers should be provided for the front wheels as well as the rear wheels, and, as above stated, the rollers which support the front wheels in the embodiment of the invention shown, are mounted for movement lengthwise of the platform relatively to the rear wheels, to accommodate automobiles of different length wheel base. The rollers 30 and 31 mounted at the opposite sides of the platform to support the front wheels of an automobile may be similar in construction and operation to the rollers 18 and 19 described, except that the front rollers in the present case are mounted upon traveling carriages consisting of the spaced side rails 32 upon which the bearing blocks 33 for the roller shafts 34 are mounted, and these side rails are secured in spaced relation to each other by transversely extending braces or bars 35. The roller supporting carriages thus formed are provided with the flange wheels 36, best shown in Fig. 11, which are rotatably mounted upon the transversely extending shafts 37 the ends of which shafts are rigidly secured to the side rails 32 by the bolts 38. The arrangement is such that the flange wheels 36 rest upon the channel irons 10 which form tracks for these rollers, so that the carriages may move to different positions lengthwise of the tracks, as will be apparent upon comparing Figs. 4 and 5.

Since the front wheels of an automobile are pivotally secured to their axle to permit steering of the automobile, it is desirable to provide one of the rollers for each pair of front wheels with the spaced wheel engaging flanges 39 adapted to engage the opposite sides of the tire to keep the wheel in the straight-ahead position. Rollers 30 and 31 of each carriage 32 are preferably connected by the sprocket chain 40, and these sprocket chains may be enclosed in a protecting casing similar to the sprocket chains 26. In order to prevent any possibility of the front wheels of the automobile running over the front rollers 31 and dropping between the spaced channel irons 10, each carriage is provided with a frame consisting of side rails 41 connected by the transversely extending bar 42, the latter being so disposed that it will act as a stop for each front wheel of an automobile should the same ride up upon the front rollers 31.

Figure 4:
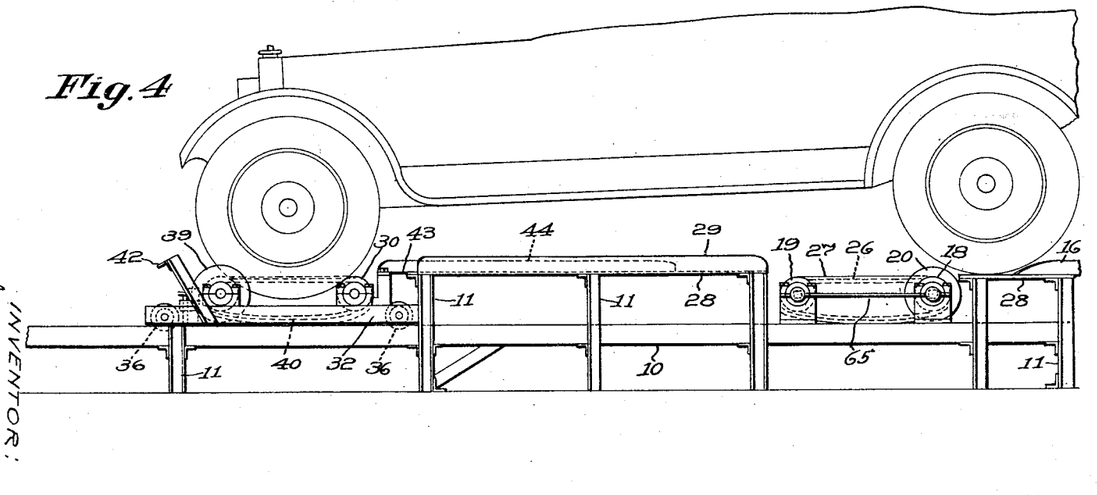
Fig. 4 is a side elevation of the brake testing platform of Fig. 1, showing the front wheels of the automobile in engagement with their supporting rollers, and the rear wheels slightly to the rear of their supporting rollers.
Figure 5:
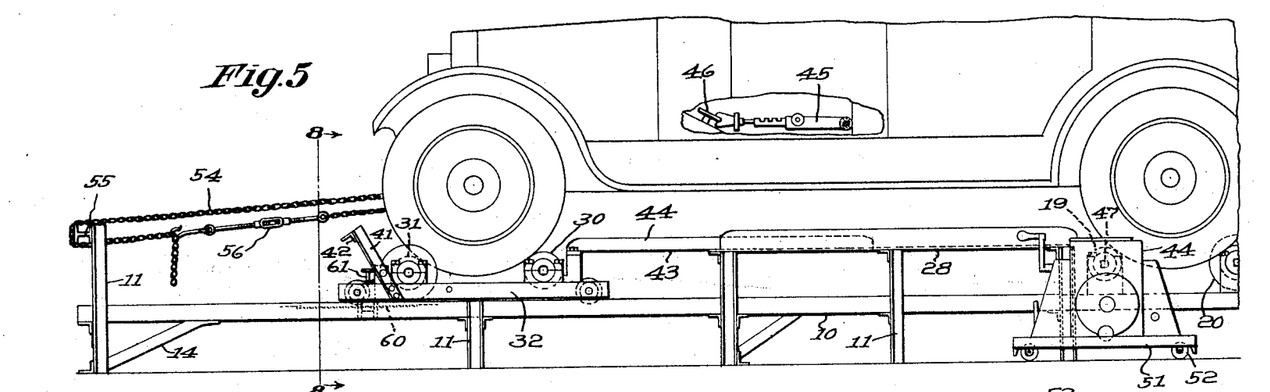
Fig. 5 is a side elevation of the brake testing device of Fig. 1 showing the wheels of the automobile in engagement with the different supporting rollers.

The traveling carriages 32 are preferably so constructed that the movement of the automobile upon the platform to the brake testing position will serve to advance the carriages 32 longitudinally of the platform a sufficient distance to accommodate the length of the wheel base of that particular automobile; that is, after the front wheels of an automobile have moved into engagement with the rollers 30 and 31 as shown in Figs. 1 and 4, the carriages will then move lengthwise of their supporting frame until the rear wheels have moved into engagement with their supporting rollers 18 and 19, as shown in Fig. 5. In order to prevent any possibility of the front wheels of an automobile from dropping between the front end of the wheel supporting runway 28 and a carriage, when the latter is not in its rearmost position, each carriage is preferably provided with a floor plate 43 which extends from the rear portion of the carriage into overlapping relation with the wheel runway 28, as best shown in Fig. 5, and the floor plate 43 is preferably provided with the upstanding wheel guiding flanges 44. The floor plates 43 serve not only to prevent the automobile wheels from dropping in the space in front of the runways 28, but serve also to prevent the carriages from moving forward along their runways while a wheel is moving from the floor plate 43 into engagement with the supporting rollers 30 and 31.

From the construction so far described it will be seen that an automobile, the brakes of which are to be tested, may be driven under its own power up the inclined runways 15 and along the horizontal runways 28 until the front wheels of the automobile are engaged with the front supporting rollers 30 and 31, and the rear wheels of the automobile are engaged with the rollers 18 and 19, as shown in Fig. 5, and it will also be seen that the carriages which support the front rollers are free to move lengthwise of the platform to accommodate automobiles of different lengths. After an automobile has been driven into the brake testing position of Fig. 5, it is then ready to have the action of the brakes upon each wheel tested, and the action of the brakes upon each wheel should be tested while the brake pedal is held depressed to the same degree throughout the entire testing operation. A pedal depressor 45 is therefore shown in Fig. 5 for holding the brake treadle 46 depressed the desired amount throughout the brake testing operation. While various treadle depressing means may be employed, one good, practical construction for holding the pedal depressed the desired amount is disclosed in the Charles F. Cowdrey Patent No. 1,568,804, granted January 5, 1926.

Figure 6:
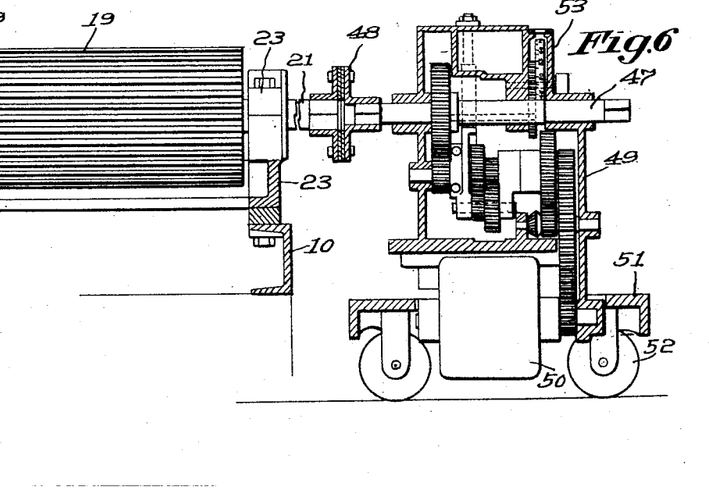
Fig. 6 on an enlarged scale is a vertical, sectional view through the roller supporting frame, showing one of the wheel supporting rollers and the driving means for the roller connected thereto.
Figure 7:
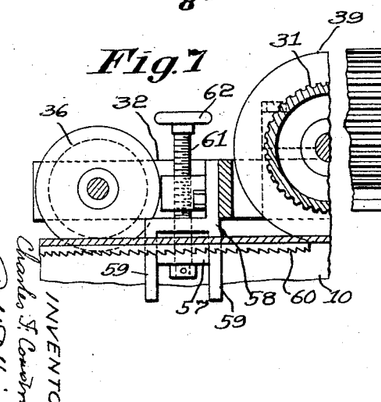
Fig. 7 is a sectional view through a portion of the supporting platform showing clamping means to be described.
Figure 8:
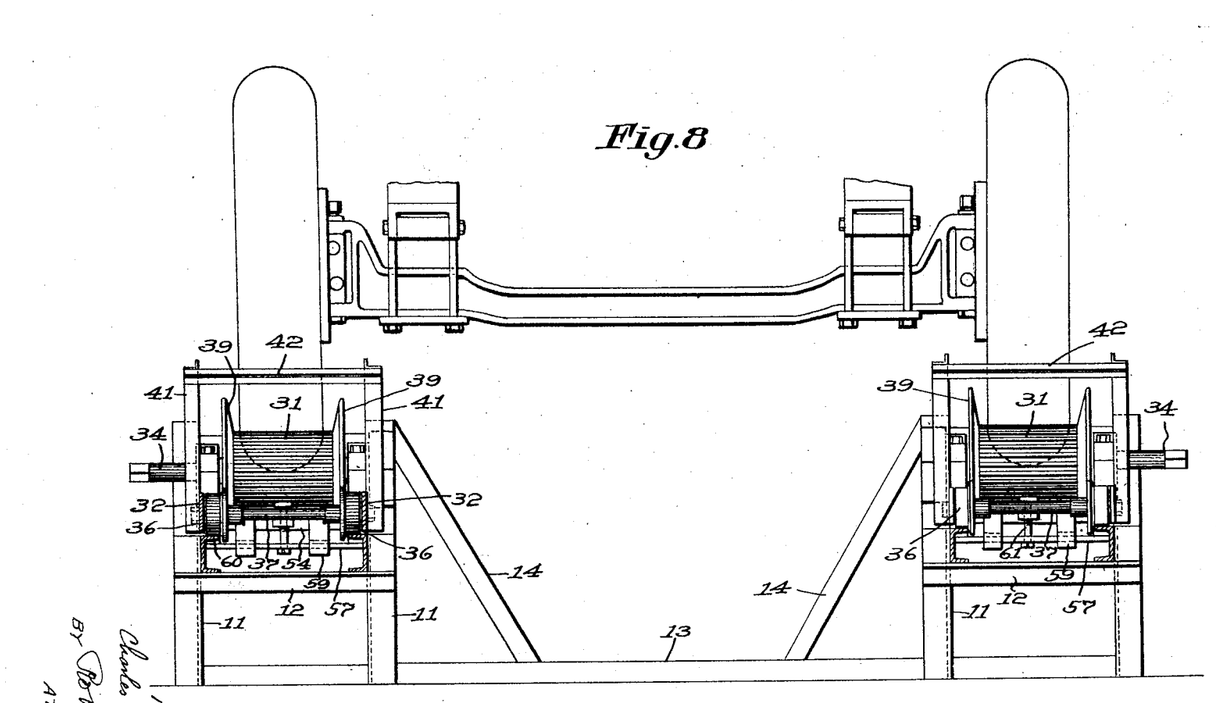
Fig. 8 on an enlarged scale is a vertical, sectional view taken on the line 8—8 of Fig. 5.

In testing the action of a brake upon a particular wheel of an automobile, in accordance with the present invention, the roller or rollers upon which that particular wheel rests are rotated to turn the automobile wheel under brake resistance, and means is provided for indicating or measuring the turning force applied to the wheel. Various means to this end might be provided and a good, practical construction which may be used for this purpose is shown in Fig. 6 as having a main shaft 47 which may be connected to a roller supporting shaft 21 or 34 by a universal joint or other form of connection 48. The driving shaft 47 is supported by the casing 49 in which a train of gears is mounted, and is driven by the electric motor 50. The casing 49 is shown as mounted upon a platform 51 provided with the supporting wheels 52 mounted in casters that are rotatably secured to the platform 51 so that the motor may be readily moved from one set of driving rollers to another, and lengthwise of the supporting frame to accommodate the different positions of adjustment of the front rollers 30, 31. The casing 49 is further provided with a graduated wheel or disk 53 which constitutes indicating means for indicating measuring the turning force exerted by the main shaft 47 upon a wheel supporting roller or other device driven by this shaft. The driving means of Fig. 6 is fully shown, described and claimed in the Cowdrey patent just mentioned, and a further description of the construction and operation of this device herein is therefore deemed unnecessary.

It will be noted that each of the wheel supporting rollers 18 and 19 and 30 and 31 is shown as provided with a central shaft having a squared outer end to receive the driving means. This construction is provided in order that the power may be applied to either the front or rear roller of a pair, but it will be apparent that since these pairs of rollers are connected by driving chains 26 and 40 it is necessary to apply the power to only one roller of each pair, as will be apparent from Fig. 5, wherein the driving mechanism of Fig. 6 is shown as attached to the front roller 19 of the pair of rollers for supporting the rear wheel of the automobile.

If the brake band upon a particular wheel is applied hard, it obviously will require considerable force to rotate that wheel under its brake resistance, and this force may tend to move the entire automobile rearwardly upon the platform. To prevent this a chain or other anchoring means 54 (see Fig. 5) may be provided, which extends from the front axle of the automobile to a transversely extending beam 55 secured to the front portion of the platform, and the tension of this chain may be varied as desired by rotating the turn buckle 56. The application of power to the rollers which support the front wheels of an automobile may tend to move the supporting carriages 32 for these rollers in a direction frontwardly of the platform. To prevent this, clamping means for the carriages of suitable construction should be provided, and the clamping means shown to this end consists of a transversely extending bar 57 which is secured to each carriage by downwardly extending brackets 58 fastened to the front portion of each carriage, and each of the brackets 58 is provided with the spaced flanges 59 which straddle the end portions of the bars 57. Each bar 57 is provided near its ends with teeth adapted to engage correspondingly shaped teeth formed upon racks 60 rigidly secured to the channel irons 10. The arrangement is such that the clamping bar 57 may be raised into firm gripping engagement with the racks 60 by rotating the threaded shaft 61, the upper end of which is provided with a hand wheel 62, and the lower end of which is rotatably secured to a central portion of the bar 57. This serves to positively clamp the carriage for the rollers 30 and 31 against movement relative to the supporting frame.

Figure 9:
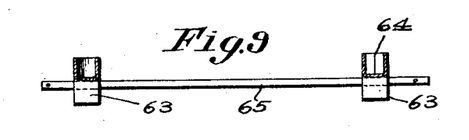
Fig. 9 is a plan view of roller locking means to be described.

After the action of the brakes upon each of the wheels of an automobile has been tested and the brake bands upon the different wheels have been adjusted to render the brake actions equal, or substantially equal, upon the opposite wheels, the automobile may be driven backward over the supporting platform under its own power, but before this is done the clamping means just described for the carriages 32 should be released to permit the carriages to move rearwardly from the position shown in Fig. 5 to the position shown in Fig. 4, under the movement of the automobile. It is also necessary to clamp or hold the rear rollers 18 against rotation before the automobile may be backed off of the supporting platform, because, unless this is done, rotation of the automobile wheels will simply rotate the rollers 18 and 19, without imparting movement to the automobile. Various means might be provided for holding the rollers 18 from rotation, and simple means to this end is shown in Fig. 9 as consisting of a stub shaft or stub shafts 63, one of which is provided with a socket 64 adapted to fit the squared end of the shafts 21, and these stub shafts may be connected by a bar 65 which will prevent them from rotating when the stub shafts are applied to the squared ends of the shafts 21, as shown in Fig. 1.

The supporting frame or platform shown and described not only constitutes a good practical construction for supporting the various wheel engaging rollers, but serves also to support the automobile in an elevated position, whereby access to the parts requiring adjustment to equalize the action of the brake bands may be had more than when the wheels of the automobile rest upon the ground. Furthermore, the construction is such that the frame constitutes a portable structure that may be readily slid over the floor from place to place, as desired.

In some cases it may be desirable to mount the wheel supporting rollers substantially flush with the floor or ground, and a modified construction to this end is therefore shown in Fig. 12. In this construction 66 designates the floor of a garage or other building, and the wheel supporting rollers 67 and 68 for the rear wheels of an automobile are mounted in a recess or hole in the floor 66, as will be apparent from the drawings. The wheel supporting rollers 69 and 70 for the front wheels of an automobile are mounted upon a carriage 71 which may be similar in construction and operation to the carriage 32 above described, and this carriage is provided with flange wheels 72 which travel along the rails or channel bars 73 that are mounted below the floor 66 in a hole or recess formed in the floor. The front carriages 71 are preferably provided with the floor plates 74 similar to the floor plates 43 above described, and the construction and operation of the various rollers are substantially the same as in the platform construction shown in Figs. 1 to 11 inclusive.

The driving means for the various rollers shown in the modified construction of Fig. 12 differs from the driving mechanism of Figs. 1 to 11 inclusive in that in this modified construction provision is made for driving all rollers from a single source of power. To this end, in the construction shown in Fig. 12, a power driven device 75, which may be similar to that shown in Fig. 6, is mounted in a recess or hole formed in the floor at a point in front of the automobile when the latter is in the brake-testing position. This driving means serves to rotate the driving shaft 76 disposed below the floor as shown, and the force applied to the shaft 76 is indicated by the graduated disk or the like 77 of the device 75. The shaft 76 is provided at its opposite ends with the bevel gears 78, and these gears are positioned to mesh with and drive bevel gears 79 secured to operating shafts 80 extending lengthwise of the brake testing device at each side of the automobile, as will be apparent from the drawings. The shafts 76 and 80 are journaled in the supporting brackets 81 and each driving shaft 80 may be placed in driving engagement with the rollers for either the front or rear wheels of the automobile. Various means to this end might be provided, and in the construction shown one of the rollers such as 68 for supporting the rear wheels of the automobile is provided with a sliding clutch 82 which is best shown in Fig. 13, and this clutch is provided with an operating lever 83 which may be manually actuated to move the clutch 82 into and out of driving engagement with the bevel gear 84 loosely mounted upon the roller supporting shaft 85 of the roller 68, and this bevel gear meshes with a bevel gear 86 rigidly secured to the driving shaft 80. The construction for driving the supporting rollers 69 and 70 for the front wheels of an automobile is similar to that just described for driving the rear wheels, except that since the carriages 71 are mounted for movement lengthwise of their supporting frame, provision is made to permit the driving pinions 87 mounted upon the shafts 80 to move lengthwise of these shafts, and to this end a portion of each shaft 80 is squared as shown, and the gear 87 is provided with a bracket 88 secured to a side of the traveling carriage 71, and which serves to slide the gear 87 lengthwise of the driving shaft 80.

As a result of the construction just described, the rollers for supporting any wheel of the automobile may be driven from the source of power 75 by simply operating one of the clutch shifting levers 83 to shift the desired clutch into driving engagement with one of the power shafts 80.

In the platform device shown in Figs. 1 to 11 inclusive the construction is such that the automobile is backed off of the platform after the brakes have been tested, but in some cases it may be desirable to drive the automobile forward off of the brake testing device and the modified device of Fig. 12 is therefore constructed so that the automobile may be driven forward over the different rollers after the brakes have been tested. To this end each of the carriages 71 of Fig. 12 is provided with a floor plate 87 that is secured to the front portion of the carriage to extend over the hole in which the carriage travels. It will therefore be seen that the two floor plates 74 and 87 that are secured to a carriage are adapted to slide along the floor 66 as the carriage moves back and forth. In this manner the front and rear wheels of an automobile may pass over the front rollers 69 and 70 without dropping into the carriage receiving pit or hole. After an automobile has passed over the brake testing device of Fig. 12 the front carriages 71 may be moved rearwardly by hand or otherwise toward the rear rollers 67, 68, into position to receive the next automobile.

It will be understood that if desired the platform type of testing device shown in Fig. 1 might be provided with the means shown in Fig. 12 whereby an automobile may be driven forward off the testing rollers, and that the various rollers shown in Fig. 1 might be driven from a single source of power as in Fig. 12.

What is claimed is:—

1. A device for testing the brakes of an automobile that the brake resistance exerted upon the wheels may be properly adjusted, comprising, in combination, wheel turning means for supporting and turning the rear wheels of an automobile, wheel turning means for supporting and turning the front wheels of an automobile, one of said wheel turning means being mounted for automatic movement towards and from the other by the automobile as it is moved to and from brake testing position to accommodate their distance apart to the length of wheel base of the automobile the brakes of which are to be tested, motor means for driving the wheel turning means, and measuring means for measuring the force necessary to turn the wheels of the automobile under the applied brake resistance.

2. A device for testing the brakes of an automobile that the brake resistance exerted upon the wheels may be properly adjusted, comprising, in combination, wheel turning means for supporting and turning the rear wheels of an automobile, independent wheel turning means for supporting and turning the front wheels of an automobile and mounted for bodily movement by the automobile towards and from the means for supporting and turning the rear wheels to accommodate automobiles of different wheel bases, motor means for driving the wheel turning means to turn the wheel resting thereon under brake resistance, means for anchoring the automobile from movement during the brake testing operation, and measuring means for measuring the turning force applied to turn the wheel under the applied brake resistance.

3. A device for testing the brakes of a four-wheel brake automobile that the brake resistance on the front and rear wheels may be properly adjusted, comprising, in combination, wheel turning rollers for supporting the front and rear wheels of an automobile, means whereby the rollers for one pair of opposite automobile wheels are mounted for relative movement towards and from the rollers for the other pair of opposite wheels to correspond to the length of wheel base of the automobile, adjustable stops for retaining the rollers for one pair of wheels in different positions of adjustment relative to the rollers for the other pair of wheels, motor means for separately turning the wheel turning rollers to turn the wheel resting thereon while under brake resistance, and measuring means for measuring the turning force applied to the wheel to turn it under the applied brake resistance.

4. In a device for testing the brakes of an automobile that the brake resistance may be equalized on the opposite wheels, the combination of a fixed support, wheel turning rollers mounted in fixed position on said support, for supporting the rear wheels of an automobile, a carriage having wheel turning rollers for supporting the front wheels of an automobile, means whereby said rollers are mounted for bodily movement relatively to the fixed rollers by the automobile as it is moved to brake testing position to accommodate variations in the wheel base of automobiles, motor means adapted to be operatively connected with a wheel turning roller to turn the wheel resting on such roller through a complete revolution, and measuring means for measuring the force necessary to turn the wheel under the applied brake resistance.

5. In a device for testing the brakes of an automobile that the brake resistance may be equalized on the opposite wheels, the combination of a fixed support, wheel turning rollers mounted in fixed position on said support, for supporting the rear wheels of an automobile, wheel turning rollers for supporting the front wheels of an automobile, means whereby said last mentioned rollers are mounted for automatic movement relative to the fixed rollers by the automobile as it is moved into brake testing position to accommodate automobiles of varying wheel bases, means for selectively driving the wheel turning rollers to turn the wheel resting thereon, and measuring means for measuring the turning force applied to turn the wheel under the applied brake resistance.

6. In a device for testing the brakes of an automobile that the brake resistance may be equalized on the opposite wheels, the combination of a fixed support, two pairs of wheel turning rollers mounted on the fixed support for supporting the rear wheels of an automobile, two pairs of wheel turning rollers for supporting the front wheels of an automobile, means whereby said last mentioned rollers are mounted to be moved relatively to the rollers for supporting the rear wheels by the automobile as it is moved into brake testing position, means for relatively driving a pair of rollers to turn the wheel resting thereon, and measuring means for measuring the turning force applied to turn the wheel under the applied brake resistance.

7. A device for testing the brakes of an automobile, comprising in combination, an automobile platform, rollers upon said platform for supporting and turning the rear wheels of an automobile, independent means having rollers and mounted on the platform for movement lengthwise of the platform by the automobile as it is driven to brake testing position for supporting and turning the front wheels of an automobile to thereby accommodate automobiles of different length wheel base, means for rotating the rollers to turn the wheels of the automobile under brake resistance, and measuring means for measuring the turning force applied to the wheels.

8. A device for testing the brakes of an automobile, comprising in combination, sets of rollers for supporting the four wheels of an automobile, means for movably supporting the sets of rollers for one pair of opposite wheels for movement automatically by the automobile towards and from the sets of rollers for the other pair of opposite wheels to thereby accommodate automobiles of different length wheel base, means for rotating the rollers of a set to turn the wheel resting thereupon under brake resistance, and means for measuring the turning force applied to the wheel by said rollers.

9. A device for testing the brakes of an automobile, comprising in combination, an automobile platform, a pair of movable carriages mounted upon the platform respectively adjacent the lateral sides thereof and each adapted to support a wheel of an automobile and to be moved lengthwise of the platform by the movement of the automobile to the brake testing position to accommodate automobiles of different length wheel base, wheel supporting means including a roller upon each carriage, means for rotating a roller to turn the wheel resting thereupon under brake resistance independently of the other wheels, and means for measuring the turning force applied to the wheel.

10. A device for testing the brakes of an automobile, comprising in combination, an automobile platform, carriages movably mounted upon the platform respectively adjacent the lateral sides thereof and each adapted to support a wheel of an automobile and to be moved automatically by the automobile lengthwise of the platform to accommodate automobiles of different length wheel base, movable tread-engaging means upon the carriages for rotatably supporting the automobile wheels, driving mechanism for said tread-engaging means adapted to rotate a wheel of the automobile under brake resistance, and means to measure the turning force applied to the wheel by the tread-engaging means.

11. A device for testing the brakes of an automobile, comprising in combination, a pair of laterally spaced carriage runways, a carriage mounted upon each runway and each adapted to support a wheel of an automobile and to move lengthwise of the runway to accommodate automobiles of different lengths, means for supporting the carriages so that they will be moved lengthwise of the runway by the movement of the automobile to its brake testing position, and means for rotating a wheel under brake resistance and for measuring the turning force applied to the wheel.

12. A device for testing the brakes of an automobile, comprising in combination, an automobile platform, a pair of movable carriages mounted upon the platform adjacent the opposite sides thereof and each adapted to support a wheel of an automobile means for supporting the carriages so that they will be moved lengthwise of the platform by the movement of the automobile to its brake testing position to thereby accommodate automobiles of different length wheel base, means for securing the carriages against movement during the brake testing operation, and means for rotating a wheel under brake resistance and for measuring the turning force applied to the wheel.

13. A device for testing the brakes of an automobile, comprising in combination, an automobile platform having wheel runways, a pair of traveling carriages upon the platform adjacent the opposite sides thereof and each adapted to support a wheel of an automobile, means for supporting the carriages so that they will be moved lengthwise of the platform by the movement of the automobile to its brake testing position, to thereby accommodate automobiles of different length wheel base, a wheel supporting floor-plate extending from each carriage into overlapping relation with a wheel runway of the platform, and means for rotating a wheel under brake resistance and for measuring the turning force applied to the wheel.

14. A device for testing the brakes of an automobile that the brake resistance exerted upon the opposite wheels may be equalized, comprising, in combination, spaced pairs of rollers for supporting the four wheels of an automobile, means for mounting the rollers that support one pair of opposite wheels for bodily movement by the automobile toward and from the rollers that support the other pair of wheels to accommodate automobiles of different length wheel base, means for rotating a roller to turn the wheel resting thereupon under brake resistance, and means for measuring the turning force applied to the wheel to turn the same.

15. A device for testing the brakes of an automobile that the brake resistance exerted upon the opposite wheels may be equalized, comprising, in combination, spaced pairs of rollers for supporting the four wheels of an automobile, laterally spaced carriage runways, a pair of carriages mounted upon the runways and each provided with a pair of said rollers to support a wheel of an automobile, and the carriages being adapted to move lengthwise of their respective runways to accommodate automobiles of different lengths, means for rotating the different rollers to turn a wheel resting thereupon under brake resistance, and means for measuring the turning force applied to the wheel to turn the same.

16. A device for testing the brakes of an automobile that the brake resistance exerted upon the opposite wheels may be equalized, comprising, in combination, spaced rollers for supporting the four wheels of an automobile, laterally spaced carriage runways, a pair of carriages mounted upon the runways and each provided with at least one of said rollers to support a wheel of an automobile and the carriages being adapted to move lengthwise of their respective runways to accommodate automobiles of different length, means for clamping the carriages in different positions lengthwise of the runways, means for rotating the different rollers to turn a wheel resting thereupon under brake resistance, and means for measuring the turning force applied to the wheel to turn the same.

17. A device for testing the brakes of an automobile, comprising in combination, an automobile supporting structure having a wheel runway adjacent each side thereof, wheel turning means for supporting and turning the rear wheel of an automobile, wheel turning means for supporting and turning the front wheels of an automobile, means whereby one of said wheel turning means is mounted for automatic movement towards and from the other by the automobile as it is moved along said runways to and from brake testing position to accommodate their distance apart to the length of wheel base of the automobile the brakes of which are to be tested, motor means for driving the wheel turning means having means responsive to the action of the brakes upon the wheels for indicating such action that the brake resistance exerted upon the wheels may be compared and equalized.

18. A device for testing the brakes of an automobile, comprising in combination, means including a roller adapted to support a wheel of an automobile and rotate the wheel under brake resistance, a movable carriage for supporting said means for movement along a predetermined path while an automobile wheel rests upon the roller, a movable platform, a motor mounted upon the platform and operable to drive the roller to turn the wheel of the automobile under brake resistance, and means for measuring the turning force applied to the roller to turn the wheel.

19. A device for testing the brakes of an automobile, comprising in combination, a pair of rollers adapted to support a wheel of an automobile and turn it under brake resistance, a movable carriage for supporting the rollers for movement along a predetermined path, a movable platform, a motor mounted upon the platform and operable to drive the rollers to turn the wheel under brake resistance, and means for measuring the turning force applied to the rollers to turn the wheel.

20. A device for testing the brakes of an automobile, comprising in combination, rollers for supporting the four wheels of an automobile, tracks for supporting the rollers for one pair of opposite wheels, means upon the tracks for supporting the rollers for movement toward and from the rollers for the other pair of wheels to thereby accommodate automobiles of different length wheel base, a movable platform, a motor mounted upon the platform and operable to drive a roller to turn the wheel resting thereupon under brake resistance, and means for measuring the turning force applied to said roller.

21. A device for testing the brakes of an automobile, comprising in combination, a platform, a carriage mounted upon the platform for movement lengthwise thereof, means including a roller upon the carriage for rotatably supporting an automobile wheel, a wheel supporting floor-plate extending from the carriage into overlapping relation with a fixed portion of the platform, means for rotating the roller to turn the wheel under brake resistance, and means for measuring the turning force applied to the roller.

22. A device for testing the brakes of an automobile that the brake resistance exerted upon the wheels may be equalized, comprising in combination, spaced rollers for rotatably supporting the rear wheels of an automobile, spaced rollers for rotatably supporting the front wheels of the automobile, mechanism for supporting the rollers for one pair of opposite wheels of the automobile for automatic movement towards and from the rollers for the other pair of opposite wheels by the automobile as it is moved to and from brake testing position to accommodate their distance apart to the length of wheel base of the automobile the brakes of which are to be tested, and means connected to the rollers for indicating the action of the brakes upon the wheels supported by said rollers that the brake resistance exerted upon the wheels may be compared and equalized.

23. A device for testing the brakes of an automobile, comprising in combination, an automobile runway having wheel supporting surfaces along which the wheels of an automobile may be driven, a track mounted along said runway but at a lower level than the runway, a carriage mounted upon the track for movement along the track, a pair of rollers mounted upon the carriage and adapted to support and rotate an automobile wheel under brake resistance, means for rotating the rollers to turn the automobile wheel resting thereon under brake resistance, and means for measuring the turning force applied to the rollers.

24. A device for testing the brakes of an automobile, comprising in combination, an automobile runway having wheel supporting surfaces along which the wheels of an automobile may be driven, a track mounted along said runway but at a lower level than the runway, a carriage mounted upon the track for movement along the track, a pair of rollers mounted upon the carriage and adapted to support and rotate an automobile wheel resting thereon under brake resistance, a wheel supporting floor-plate extending from the carriage into overlapping relation with the surface of said runway and adapted to travel with the carriage, means for rotating the rollers to turn the automobile wheel thereon under brake resistance, and means for measuring the turning force applied to the rollers.

25. A device for testing the brakes of an automobile, comprising, in combination, automobile wheel supporting and turning means for supporting and turning one pair of wheels respectively at opposite sides of an automobile, a motor for operating the wheel supporting and turning means to turn the wheel resting thereon under brake resistance, carriages for supporting the other pair of wheels respectively at opposite sides of the automobile and mounted for automatic movement relative to the first mentioned wheel supporting and turning means by the automobile as it is moved to brake testing position, and means for measuring the turning force applied to turn the wheels under brake resistance.

26. A device for testing the brakes of an automobile, comprising, in combination, automobile wheel supporting and turning means for supporting and turning one pair of wheels respectively at opposite sides of an automobile and mounted in fixed position, a motor for operating the wheel supporting and turning means to turn the wheel resting thereon under brake resistance, carriages for supporting the other pair of wheels respectively at opposite sides of the automobile and mounted for automatic movement relative to the first mentioned wheel supporting and turning means by the automobile as it is moved to brake testing position, and means for measuring the turning force applied to turn the wheels under brake resistance.

27. A device for testing the brakes of an automobile, comprising, in combination, wheel turning rollers for supporting and turning one pair of wheels respectively at the opposite sides of an automobile, carriages for supporting the other pair of wheels respectively at the opposite sides of an automobile and mounted for automatic movement relatively to said wheel supporting rollers by the automobile itself as it is moved to brake testing position, means for selectively turning said rollers to rotate a wheel resting thereon under brake resistance, and means for measuring the turning force applied to the wheel.

28. A device for testing the brakes of an automobile, comprising, in combination, wheel supporting and turning means for supporting and turning one pair of opposite wheels of the automobile, wheel supporting and turning means for supporting and turning the other pair of opposite wheels of the automobile means whereby said last named supporting means is mounted for automatic movement relative to the first mentioned wheel supporting and turning means by the automobile as it is moved to brake testing position to automatically accommodate the brake testing device to different lengths of wheel base, and means for measuring the turning force applied through the wheel supporting and turning means to turn the wheel resting thereon under brake resistance.

29. In a brake testing machine, the combination of a stationary carriage adapted to carry the rear wheels of a motor vehicle, a movable carriage means adapted to carry the front wheels of a motor vehicle, said movable carriage means being mounted so as to automatically accommodate itself to the wheel base of the vehicle to be tested, means mounted on said stationary carriage for supporting the rear wheels of the vehicle, means mounted upon the movable carriage means for supporting the front wheels of the vehicle, and means acting through said supporting means for rotating said vehicle wheels for brake testing purposes.

30. In a brake testing machine, the combination of relatively movable carriage means, rotating rollers on each carriage means for rotating a motor vehicle wheel frictionally contacting therewith, and means for individually measuring resistance offered by each wheel to rotation.

In testimony whereof, I have signed my name to this specification.

CHARLES F. COWDREY.